Patented Dec. 17, 1935

2,024,666

UNITED STATES PATENT OFFICE 2,024,666

EXTRACTION OF CELLULOSE ESTERS

Cyril J. Staud and Edward C. Yackel, Rochester, N. Y., assignors to Eastman Kodak Company, Rochester, N. Y., a corporation of New York No Drawing. Application April 28, 1932,
Serial No. 608,133

11 Claims. (Cl. 260—102)

The present invention relates to the extraction of an organic ester of cellulose with liquids such as acetone-water, acetic acid-water, etc., to separate the portions of lowest viscosity from the ester, and the products made from the extracted cellulose ester.

It is known in the prior art to fractionate cellulose acetate by precipitating an acetone solution of the acetate into water. This operation however, involves many technical difficulties when it is carried out on a commercial scale. In that method the entire mass of cellulose acetate is first dissolved in acetone, which necessitates a large amount of that solvent. The subsequent separation of the acetone from the water with which it has become mixed upon precipitation is an expensive operation which is entirely eliminated in the process we have discovered. That method of the prior art also necessitates the use of large and complex apparatus and in addition it involves a danger due to the large amount of the highly inflammable acetone which must be handled when undiluted with a non-inflammable diluent. In our method of fractionating cellulose esters there is no necessity of handling acetone in undiluted condition so that any danger of explosion is reduced to a minimum.

We have found that by simply stirring technical cellulose esters, especially cellulose acetate, with an acetone-water or acetic acid-water mixture the residue has an increased viscosity in acetone and an increased stability to the action of hot water over that shown by the original cellulose acetate. However, the acetyl content of the extracted cellulose ester is the same as that of the starting material. The viscosity of the material obtained by the evaporation of the extractant is low.

It is our theory that in the esterification of cellulose, when the esterifying conditions are maintained until complete esterification has taken place, some of the cellulose molecules are broken down or degraded to some extent. It is known that under severe conditions, known as acetolysis, the cellulose is broken down to cellobiose, glucose, etc. This represents an extreme case and one which is apparently not met with in the technical preparation, of cellulose acetate since no cellobiose has as yet been found in the resulting product of that process. There appears to be some degradation of the cellulose molecule in many esterification processes and the present extraction process separates out the degraded material from that which exhibits greater viscosity and resistance to moisture. These differences in cellulose acetates having the same acetyl content may however be due to some other reason, such, for example, as isomerism of the molecules. Whatever the cause we have found that different fractions of cellulose acetate having the same acetyl content differ in physical properties and it is to the separation of these materials and their use in commercial products for which they are particularly suitable that this application is directed.

The following example illustrates the application of our invention to the extraction of cellulose acetate with acetone-water:

100 lbs. of ordinary commercial acetone-soluble cellulose acetate was placed in a vessel fitted with a mechanical stirrer, containing 2500 lbs. of 60 volume per cent of acetone and 40 volume per cent of water. The mass was stirred for about 6 hours. The acetone-water was then pressed off from the cellulose acetate which was then washed with acetone-water several times and then with water and dried.

The following table gives the comparative properties of two different samples of cellulose acetate before and after extraction in the manner described above:

|  | Before extraction | | After extraction | |
| --- | --- | --- | --- | --- |
|  | Sample 1 | Sample 2 | Sample 1 | Sample 2 |
| Viscosity (seconds) | 12 | 14 | 24 | 27 |
| Percent unstable to boiling water | .356 | .346 | .239 | .226 |
| Acetyl content | 39.6% | 39.1% | 40.0% | 39.4% |
| Acetone solubility | Good. | Good. | Good. | Good. |

The viscosity was determined according to the well known method of determining the time a steel ball will fall thru 10 c. m. of an acetone solution consisting of 4 parts of solvent and 1 part of cellulose acetate, both by weight. The percentage of acetate unstable to boiling water is taken as that portion of the acetyl content which appears as free acetic acid as a result of heating the cellulose acetate in a sealed tube with distilled water for 16 hours at 100° C.

From the above data it is apparent that the viscosity of the extracted cellulose acetate is approximately double that of the original cellulose acetate and that the amount of acetic acid split off by heating with boiling water for 16 hours is only about 60% of the starting material.

Obviously the proportion of acetone to water in the above extraction may be varied as desired however we have found that the preferred proportion of acetone in the acetone-water mixture is between 40 and 80 volume per cent. It has been our experience that when 40 volume per cent of acetone is employed but a small amount of the low viscosity acetate is dissolved out. If the ester being extracted has only a very small content of low viscosity material or if it is desired in an ordinary ester to only remove a small fraction, this 40 volume per cent acetone-60 water mixture would of course be suitable.

Altho an acetone-water mixture having a very high (80 for example) volume per cent of acetone may be employed as an extractant, the cellulose acetate employed is swelled by this liquid and the resulting material is difficult to filter or centrifuge and the subsequent washing of the product is slow and tedious.

Altho the ratio of extractant to solid given in the example is 25:1, this factor is merely a matter of judgment on the part of the individual operator. It has been our experience that proportions as low as 3:1 may be employed but due to the practical difficulty of stirring, in the use of only small amounts of liquid, a higher ratio is preferred. In the other direction the ratio of extractant to cellulose ester may be almost unlimited, however, for practical reasons it would seem unwise to carry out the extraction with more than 50 parts of the extractant to one part of the ester.

Fractionation of cellulose acetate may also be carried out by means of an extractant of acetic acid and water, which fractionation may be especially useful as an additional step in the production of cellulose acetate. For example, an acetic acid solution of cellulose acetate after hydrolysis may be precipitated into acetic acid of a strength just below that where some acetate remains in solution according to the method disclosed and claimed in U. S. Patent No. 1,823,348 of H. T. Clarke. A uniform precipitate, easy to handle and filter is obtained. The strength of the acetic acid is increased to the point where 5-10% of the precipitate re-enters into solution. In the meantime the entire mass is agitated. The low viscosity portion of the cellulose acetate redissolves and the remaining mass is filtered off and washed in the customary manner. For a cellulose acetate of 40-41% acetyl content the strength of the acetic acid when the acetate is precipitated is about 35-40%. To remove 5-10% of the acetate (the low viscosity portion) the strength of the acetic acid is increased to 45-50%.

In lieu of increasing the strength of the aqueous acetic acid for the redissolving of a small portion of the acetate, the precipitation bath as described above may be heated. For example, the mineral acid in the dope prior to precipitation is neutralized with sodium carbonate. This step is advisable to forestall danger of hydrolysis during the heating portion of the extraction. The dope is then precipitated in dilute glacial acetic acid according to the method of the Clarke Patent No. 1,823,348. The temperature is then raised to a point where 5-10% of the cellulose acetate enters into solution. The remaining acetate is filtered off while the solution is still at this temperature and is then washed with hot aqueous acetic acid and then with water and dried. When an acetate of 40-41% acetyl content is extracted in this manner, the precipitation bath has a strength of 35-40% and the precipitation is carried out at a temperature of 20-30° C. To accomplish the extraction the temperature of the bath is then raised to about 80-100° C. at which temperature 5-10% of the precipitated acetate redissolves.

Our process may be applied in general to any of the esters of cellulose containing a lower fatty acid group such as cellulose propionate, cellulose butyrate, cellulose acetate-propionate, cellulose acetate-butyrate, cellulose nitroacetate, etc. For example, a 100 gram sample of cellulose nitroacetate containing 1-2% nitrogen was extracted with 2 liters of 65% aqueous acetone by volume in the same manner as employed for the acetate in the first example, washed and dried. The resulting material was dissolved in acetone and coated into a skin or sheet in the customary manner. The extracted cellulose nitroacetate was found to produce a skin of much greater flexibility than a skin prepared in a like manner from the original unextracted material.

One marked advantage of our process of extraction of cellulose acetate is the improvement in the flexibility of skins made from an extracted cellulose acetate over that of skins made from the original ester. For example, an acetone-soluble cellulose acetate was extracted according to our invention and the resulting cellulose acetate was dissolved in acetone and skins were coated from this solution. These skins were compared with skins of the original material with the following results:

The repeated extraction of cellulose esters with fresh extractant increases still further the flexibility of the skins produced from the extracted ester. However, in most instances one extraction is sufficient for the purpose desired. In the case of cellulose acetate which gives skins of a brittle nature, extraction either once or repeatedly has been found to be especially useful. In this way cellulose acetates having no utility for the manufacture of sheeting may by our invention have a portion or all of the non-flexible part removed and give skins or sheets which are of value commercially. Two different samples of cellulose acetates giving brittle films were extracted with the following results.

*Sample I*

| Skin | Thickness (thousandths of an inch) | Flexibility (folds) |
| --- | --- | --- |
| Original material | | Brittle. |
| First extraction | 5³⁄₁₆ | 1½ |
| Second extraction | | |
| Third extraction | 4¹⁵⁄₁₆ | 3 |

*Sample II*

| Skin | Thickness (thousandths of an inch) | Flexibility (folds) |
| --- | --- | --- |
| Original material | | Brittle. |
| First extraction | 5³⁄₁₆ | 1½ |
| Second extracton | 5¼ | 1¾ |
| Third extraction | 3⅜ | 3½ |

From the above it may be seen that by our invention brittle cellulose acetates may be converted into products which form skins having flexibilities comparable to the skins formed from the products obtained by the approved methods of acetylation.

The flexibility of skins obtained from extracted esters of cellulose containing fatty acid groups in general is greater than the flexibility of skins from the original material. For example two samples of cellulose nitroacetate were tested to determine the difference in flexibility between the skins from extracted and unextracted material with the following results.

| Skin | Thickness (thousands of an inch) | Flexibility (folds) |
|---|---|---|
| *Sample I* | | |
| Original cellulose nitroacetate | 4¹¹⁄₁₆ | ¾ |
| Extracted cellulose nitroacetate | 5¼ | 1¾ |
| *Sample II* | | |
| Original | 5¼ | 8 |
| Extracted | 5⁵⁄₁₆ | 10¼ |

From these results it may be seen that the skin made of extracted material may be thicker than that of the unextracted ester and still exhibit much great flexibility.

Skins may also be made from a mixture of extracted and unextracted cellulose ester if desired. In the case of the acetate the skins formed from such a mixture are many times more flexible than the skins formed from either the extracted or the unextracted cellulose acetate. This phenomenon is readily understandable in view of the commonly accepted theory of the structure of cellulose which postulates the presence of long chains of anhydroglucose groups. A considerable number of these chains are believed to be held together by secondary valence forces, whereas the chains themselves are considered as being united by primary valence linkages. The groups of chains will be referred to herein as micelles or particles of cellulose and are thought to represent the condition of cellulose in its colloidal form.

It is believed that the residue remaining after extraction according to our invention is more homogeneous than the original cellulose ester in that the material which is of smaller micellar magnitude has been removed. This theory explains the high viscosity of the extracted cellulose acetate in acetone and the low viscosity of the portion which has been removed from the residue.

It is believed that when an extracted and unextracted cellulose acetate are physically mixed that a correct distribution of the various sizes or micellar magnitudes may be obtained to obtain improved physical properties such as flexibility in the films. Obviously with some extracted and unextracted cellulose acetates, the distribution of the particles will be such that their combination in various proportions will not give a product of optimum physical properties.

As extracted cellulose esters are resistant to the action of boiling water its value in making artificial silk is at once apparent. These esters are resistant to the delustering action of moisture in general so that silk made therefrom will retain its original appearance and may be subjected to ordinary laundering methods such as are employed at the present time for ordinary cotton goods. As our extracted cellulose esters are more resistant to heat than those which are employed commercially at the present time, many uses such as in laminated glass manufacture, in lacquers for cooking utensils etc. at once suggest themselves.

Many other modifications of our process and uses of our products than those mentioned herein are apparent to the individual in view of the above disclosure and are within the scope of our invention.

The terms "extracted cellulose esters" and "extracted cellulose acetate" herein refer to the residue remaining after the treatment with the extractant, which material is according to our theory the particles of larger micellar magnitude of the original material.

We claim as our invention:

1. The process of fractionally extracting a cellulose ester containing an acyl group which comprises subjecting it to extraction by a liquid selected from the group consisting of acetone-water and acetic acid-water.

2. The process of fractionally extracting a cellulose acetate which comprises subjecting it to extraction by a liquid selected from the group consisting of acetone-water and acetic acid-water.

3. The process of fractionally extracting cellulose acetate which comprises subjecting it to extraction by acetone-water.

4. The process of fractionally extracting cellulose acetate which comprises subjecting it to extraction by acetic acid-water.

5. The process of fractionally extracting cellulose acetate which comprises subjecting it to extraction by acetone-water comprising 40–80 volume per cent of acetone.

6. The process of fractionally extracting cellulose acetate which comprises subjecting it to extraction by acetone-water comprising 60 volume per cent of acetone.

7. The process of fractionally extracting a hydrolyzed acetone-soluble organic acid ester of cellulose which comprises subjecting it to extraction by a liquid selected from the group consisting of acetone-water and acetic acid-water.

8. The process of fractionally extracting a hydrolyzed acetone-soluble cellulose acetate which comprises subjecting it to extraction by acetone-water.

9. The process of fractionally extracting a hydrolyzed acetone-soluble cellulose acetate which comprises subjecting it to extraction by acetic acid-water.

10. A composition of matter resulting from the fractional extraction of a cellulose ester containing an acetyl group by a liquid selected from the group consisting of acetone-water and acetic acid-water.

11. The process of removing degraded products by extraction from an acetone-soluble organic acid ester of cellulose in which the acetyl value of the extracted portion has substantially the same acetyl value as that of the bulk of the ester, which comprises subjecting such ester to extraction by a liquid which is a solvent for the degraded portion of the ester but a non-solvent for the bulk of the ester.

CYRIL J. STAUD.
EDWARD C. YACKEL.